(12) United States Patent
Rosenow et al.

(10) Patent No.: US 10,131,565 B2
(45) Date of Patent: Nov. 20, 2018

(54) PREFORM FOR AN OPTICAL WAVEGUIDE AND A FIBER WITH NON-CIRCULAR CORE

(71) Applicant: j-plasma GmbH, Jena (DE)

(72) Inventors: Ralitsa Rosenow, Jena (DE); Roland Heinze, Jena (DE); Jörg Kötzing, Jena (DE); Robert Hanf, Eisenberg (DE); Lothar Brehm, Jena (DE)

(73) Assignee: j-plasma GmbH, Jena (DE)

( * ) Notice: Subject to any disclaimer, the term of this patent is extended or adjusted under 35 U.S.C. 154(b) by 594 days.

(21) Appl. No.: 14/687,215

(22) Filed: Apr. 15, 2015

(65) Prior Publication Data

US 2015/0301278 A1 Oct. 22, 2015

(30) Foreign Application Priority Data

Apr. 16, 2014 (DE) .................. 10 2014 207 371

(51) Int. Cl.
| | | |
|---|---|---|
| *G02B 6/02* | (2006.01) | |
| *C03B 37/012* | (2006.01) | |
| *C03B 37/025* | (2006.01) | |

(52) U.S. Cl.
CPC .... *C03B 37/01211* (2013.01); *C03B 37/0253* (2013.01); *C03B 2201/02* (2013.01); *C03B 2201/12* (2013.01); *C03B 2203/12* (2013.01); *C03B 2203/23* (2013.01); *C03B 2205/40* (2013.01); *C03B 2205/42* (2013.01); *C03B 2205/56* (2013.01); *C03B 2205/72* (2013.01)

(58) Field of Classification Search
CPC ........... C03B 37/01211; C03B 37/0253; C03B 2205/40; C03B 2203/12; C03B 2205/56; C03B 2205/42; C03B 2201/12; C03B 2205/72; C03B 2203/23; C03B 2201/02

See application file for complete search history.

(56) References Cited

U.S. PATENT DOCUMENTS

| | | | |
|---|---|---|---|
| 4,859,223 A | 8/1989 | Kajioka et al. | |
| 5,566,267 A | 10/1996 | Neuberger | |
| 8,059,930 B2 * | 11/2011 | Nakai ................... | C03C 25/105 385/123 |
| 8,655,130 B2 | 2/2014 | Neuberger | |

(Continued)

FOREIGN PATENT DOCUMENTS

| | | |
|---|---|---|
| DE | 102009004756 | 2/2011 |
| DE | 102013202589 | 8/2013 |

(Continued)

OTHER PUBLICATIONS

Anping Liu and Kenichi Ueda, "Propagation losses of pump light in rectangular double-clad fibers", Optical Engineering, vol. 35, No. 11, Nov. 1996, pp. 3130-3134.

*Primary Examiner* — Ellen Kim

(74) *Attorney, Agent, or Firm* — Posternak Blankstein & Lund LLP

(57) ABSTRACT

Preform for an optical waveguide containing a core with a non-circular geometry and at least one cladding layer, in which the dopand concentration of the cladding layer is increased compared to the dopand concentration of a preform with circular core geometry and identical NA. A method for the production of a preform for an optical fiber is provided. An optical waveguide with a nominal dopand concentration of $c(\text{eff}) \times F \leq c(\text{nom})$ in at least one cladding layer is also provided.

11 Claims, 3 Drawing Sheets

(56) References Cited

U.S. PATENT DOCUMENTS

2005/0265678 A1 12/2005 Manyam et al.
2012/0069861 A1* 3/2012 Neuberger ............... G02B 6/02
                                                            372/6

FOREIGN PATENT DOCUMENTS

EP          2933238     10/2015
WO       2010138747    12/2010
WO       2014023799     2/2014

* cited by examiner

PREFORM FOR AN OPTICAL WAVEGUIDE AND A FIBER WITH NON-CIRCULAR CORE

CROSS REFERENCE TO RELATED APPLICATIONS

This application claims the benefit under 35 U.S.C. § 119(a)-(d) of German Application No. DE 10 2014 207 371.5, filed on Apr. 16, 2014, the disclosure of which is incorporated by reference herein.

BACKGROUND

Non-circular cores are used in optical fibers and light guiding rods to optimize mode mixing. This can be used to homogenize beam profile or increase the coupling efficiency of pump light in active fibers. Due to the use of non-circular core shapes there are disadvantages too. Mode mixing leads to an increased loss especially of certain mode groups propagating mainly in the outer region of the core. This effect is highly relevant for core rods with a minimum of corner roundness. In addition to the increased loss there is a decrease of numerical aperture (NA). But in many applications it is very important to achieve a certain numerical aperture. The value of the NA can in principle be adjusted by the refractive index difference between the core and the cladding. For circular shaped cores it is possible to calculate the NA out of the refractive index difference. If an undoped core material is to be used and the cladding is doped only with fluorine it is possible to calculate the necessary fluorine concentration from the target refractive index difference and set this during preform production. Because of the additional losses based on mode mixing described before this simple approach does not work out for non-circular shaped core geometries.

There are some methods for the production on non-circular shaped core geometries known from the state of the art. In U.S. Pat. No. 4,859,223 a method is described producing a core section first and then removing the outer parts mechanically to obtain a non-circular core. Afterwards a cladding is applied and the preform drawn to a fiber. This results in desirable properties with respect to maintaining the polarization of certain modes.

U.S. Pat. No. 5,566,267 describes a production method for fibers with aspect ratios, which are aligned to the laser source. This results in a very high coupling efficiency. Furthermore an increased power density level can be obtained. The plasma based process used with this method deposits material mainly on the long side of the core and rarely at the edges.

German application DE 10 2009 004 756 describes a method where a rectangular core rod is jacketed with a cladding tube. This minimizes thermal stress and gives a better angularity. DE 10 2013 202 589 describes a method for the production of non-circular shaped core preforms with a thermal deposition of the cladding part. Due to the rounding of the corners an additional process step is necessary to straighten the edges mechanically.

U.S. Pat. No. 8,655,130 describes a method for the production of preforms with very small edge rounding. This is achieved by a modified plasma based inside deposition technique. So fibers with high angularity can be obtained, which results in coupling light energy out of the fiber core yielding in additional loss.

WO 14023799 describes a method for a highly homogenous dopand distribution in the cladding by depositing a first cladding layer to fill the valleys between the edges with a first set of process parameters. The preform is grinded to a round outer shape and prepared for the deposition of the second cladding layer. This layer is deposited under process parameters which might be identical to the first set, but do not have to be. This process is driven to have the dopand concentration of the second cladding layer identical with the first cladding layer.

SUMMARY OF THE INVENTION

Therefore it is an object of the present invention to produce preforms for waveguides with non-circular cores having a specified NA.

DETAILED DESCRIPTION OF THE INVENTION

Figure 1:
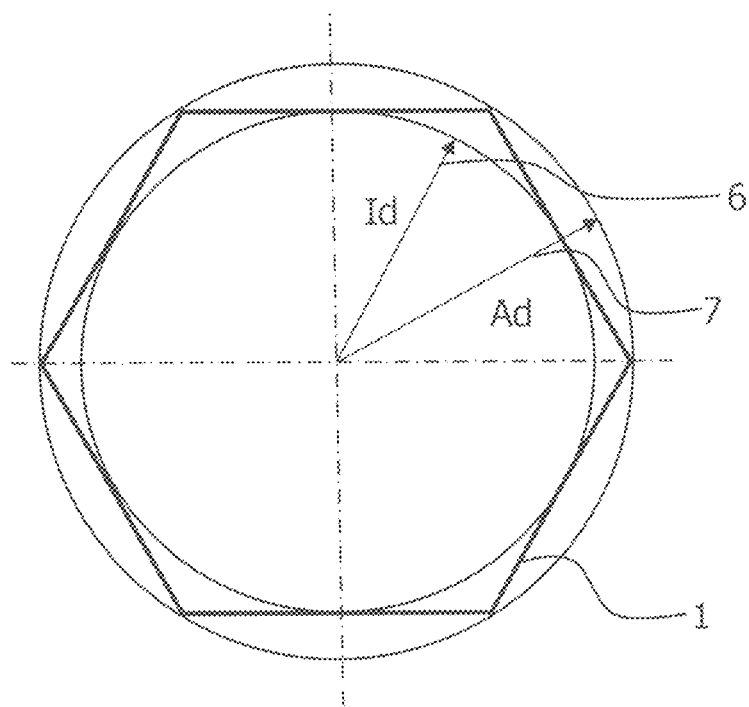
FIG. 1 shows a regular hexagon. The outer diameter Od is shown by 7 and the inner diameter Id is shown by 6. The outer diameter Od is determined by the circle containing the corners of the hexagon. The inner diameter Id is determined by the circle touching the sides at only 1 point. Such hexagons might be used as core geometry as well as cladding geometry.
Figure 2:
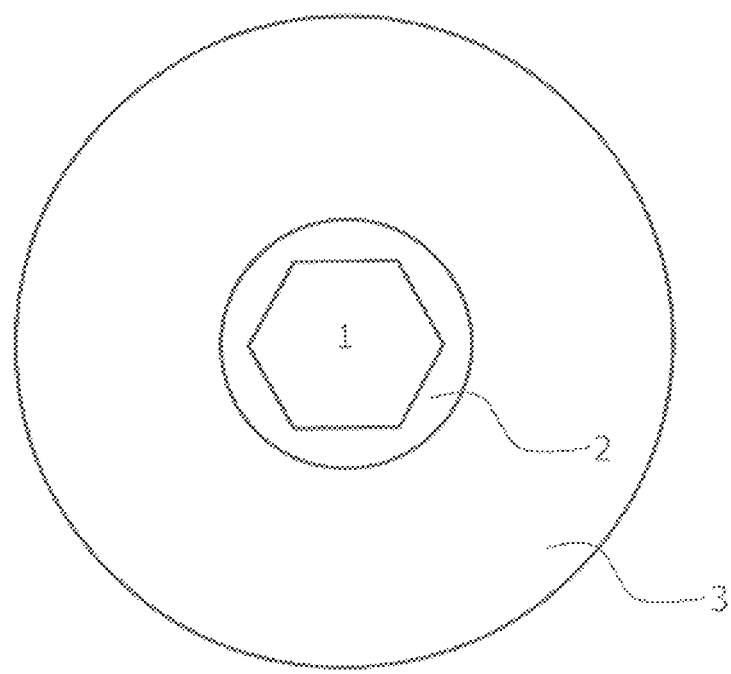
FIG. 2 shows a waveguide with a hexagonal core 1 and a circular cladding 2. A barrier layer 3 is applied onto the cladding layer to generate tension.
Figure 3:
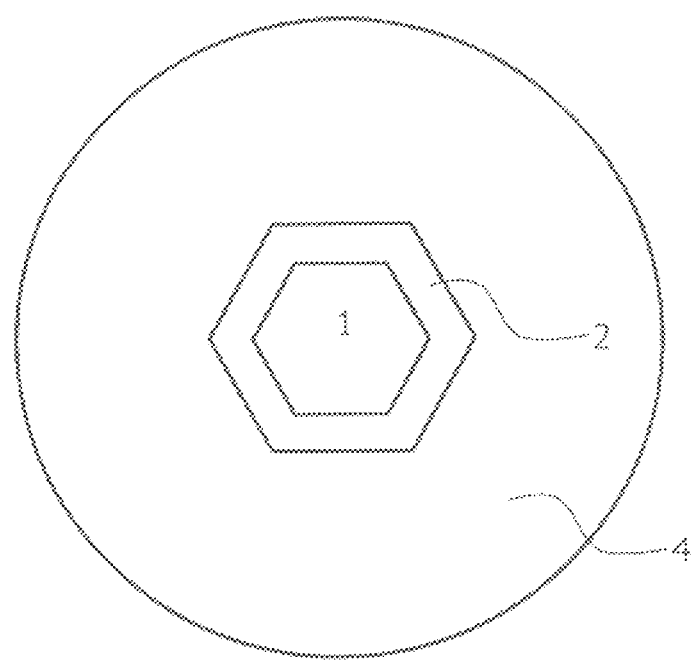
FIG. 3 shows a waveguide with hexagonal core 1 and hexagonal cladding 2. A coating 4 is applied to yield a circular outer geometry. For the production of fiber bundles the coating can be removed, in order to ensure optimal stacking of the single waveguides.

The object of the invention is achieved by determining a dopand concentration in connection with the core geometry, which compensates for the NA-reducing effects, and therefore results in the target NA at the final waveguide. The parameters covered are number of edges, rounding of edges and tension generated by additional cladding layers. Furthermore the coating, which will be applied to the drawn fiber, has to be taken into account. Considering these parameters the dopand concentration of the cladding layer can be determined. This is used during a direct deposition process based on POVD (plasma outside vapor deposition) or the production of a cladding tube to set a dopand concentration yielding a raised NA for a circular core but meeting the target NA value for the non-circular core because of the loss effects. Thus the object of the present invention is achieved by using an increased dopand concentration compared to a preform with a circular core geometry. Although the invention is not limited to any specific dopand, the following detailed description uses fluorine as dopand, since this dopand is very common for the production of optical fibers and lightguiding rods according to the invention.

This increased fluorine concentration (nominal fluorine concentration) yields an effective fluorine concentration at the produced fiber, which can be used to calculate the refractive index difference and the resulting NA. In practice the target numerical aperture of the fiber is given, transferred to an effective fluorine concentration and with respect to the target fiber design the nominal fluorine concentration is calculated and set as target value during production.

This necessary enhancement of the fluorine concentration can be described by a factor F. This factor comprises different parts and can be calculated as follows:

$$F = V \times (1+(C-1) \times N) \times (1+(S-1) \times N)$$

with V the core rounding, C the influence of the coating and S the dependence of a barrier layer. N is the number of corners. In most cases C and S are significantly smaller than V so only V can be used as good approximation.

The parameter C can be calculated as follows:

$$C = \frac{1}{1-(NA_{Coating} - NA_{Cladding})^3}$$

whereas the numerical apertures of the coating and cladding have to be used. This equation is only valid for coatings with an optical function, i.e. NA(coating)>NA(cladding). If the numerical aperture of the coating is smaller or equal to the NA of the cladding, the factor C is set to 1. The numerical aperture of coating and/or cladding is always calculated with respect to the light guiding core.

The parameter S can be calculated as follows:

$$S = 1 + (CTE_S - CTE_C)^{SCV}$$

with $CTE_S$ being the coefficient of thermal expansion of the barrier layer and $CTE_c$ the coefficient of thermal expansion of the cladding. These are dependent on the composition of the barrier and/or cladding layer and can be found in literature. If there is no barrier layer, the parameter S is set to 1. The SCV (barrier-cladding-ratio) can be calculated by dividing the outer diameter of the barrier layer by the outer diameter of the cladding.

For the calculation of the fluorine concentration the number of corners N and the connected corner rounding is very important. The corner rounding can be calculated as follows:

$$V = 1 - \frac{Od/Id - 1}{1/\cos(180/N) - 1}$$

Od describes the outer diameter touching the corner of the polygon. Id describes the inner diameter touching the sides of the polygon.

This relation is valid for any regular polygon. The number of corners N is less than 100, preferably less than 20 and more preferably less than 8. Due to production tolerances polygons are still regular in terms of this invention, if the inner angles deviate by less than 10% from each other. For polygons with uneven edge length (e.g. rectangles), the corner rounding can be calculated after reducing the edge length to an uniform value. This value is usually the edge length of the shortest edge. For a core geometry with a limited number of corners there is a minimum corner rounding of 0. This can be increased due to non-optimum parameters during the production process. In certain cases it is necessary to set a defined corner rounding (which might be higher than the minimum). In dependence of the expected corner rounding the NA-loss can be calculated and compensated in the cladding layer fluorine concentration target value. So the adjustment of the fluorine concentration during the production process of the preform is:

$$c(\text{eff}) \times F \leq c(\text{nom})$$

with the effective fluorine concentration c(eff) and the nominal fluorine concentration c(nom). The effective fluorine concentration can be deduced from the NA. Therefore the NA is measured and converted into a refractive index difference. From this value the fluorine concentration can be calculated. The nominal fluorine concentration can be determined by spectroscopy for example.

Due to the non-circular core geometry the cladding layer thickness can show irregularities depending on the cladding layer production process. There is a minimum cladding layer thickness which depends on the signal wavelength, that has to be applied. If this thickness is below the target value, waveguiding does not work properly and very high losses are observed.

If the minimum cladding layer thickness is applied the losses comprise the above mentioned aspects. Furthermore the cladding layer thickness can be optimized by using a non-circular cladding layer geometry. If a circular cladding layer is to be applied to a hexagonal core shape at the flat sides the CCDR (clad to core diameter ratio) has to be significantly larger than the minimum to yield the minimum CCDR at the corners. Therefore it might be preferable to adjust the cladding layer geometry to the core geometry. If a hexagonal cladding layer is applied to a hexagonal core the cladding layer thickness is equal at every position and cladding material can be saved. A non-circular cladding geometry can also be advantageous if the fibers are processed to fiber bundles, because the dead volume during bundle production is lower. This results in a better processability during bundle production since there are few hollow gaps the fiber geometry during fusing to bundles is conserved. Within the bundle production fibers can be used which are optimized for increased stability against electromagnetic radiation by adjusting the process parameters and core and cladding materials. Especially a resistance against ultraviolet or high-energy (x-ray, gamma) can be achieved. The invention may be carried out with these process steps:

An effective dopand concentration for the cladding is obtained from the NA. In a second process step the nominal dopand concentration is adjusted. Therefore the nominal dopand concentration is deduced from the effective dopand concentration depending on the parameters characterizing the waveguide structure. These parameters are the core geometry and mechanical parameters of the waveguide parameters. Afterwards a preform with an intended core geometry is produced. The core part is combined with the cladding with the nominal dopand concentration.

In an embodiment of the present invention an undoped core is used having the form of a regular hexagon. Furthermore a fluorine doped tube is produced having a fluorine concentration of 2 to 8 wt %, preferably between 5 and 7 wt %. This fluorine doped rod is collapsed onto the core rod. Afterwards a barrier layer is applied to the fluorine doped cladding layer. It has been found advantageous if the outer diameter of the barrier layer is more than 2.5 times, preferably more than 4 times and even more preferably more than 5.8 times the core diameter.

In another embodiment a doped core is used. Dopands can be either increasing the refractive index (germanium, phosphorous, aluminium, rare earth elements) or decreasing the refractive index (fluorine, boron). Around the doped core material which has a non-circular shape (square, rectangular, hexagonal, octagonal are the most common shapes, but any regular polygon or other forms, e.g. D-shape, double-D-shape, W-shape are possible) a cladding is applied. This can be undoped or doped with refractive index altering dopands. Usually the cladding layer is undoped or doped with fluorine. By using a fluorine doping, the refractive index difference between core and cladding can be increased, increasing the NA.

In another embodiment a square core is surrounded with a fluorine doped cladding layer. The fluorine concentration was set to obtain a NA of 0.2 at a circular fiber. When drawing this preform to a fiber in the early stage of the drawing process the drawing temperature was so high, that due to surface tension a circular fiber was drawn out of the square preform. A measurement of the NA at this circular fiber gave a value of 0.2. When drawing the preform with reduced drawing temperature and conservation of the square geometry a NA of 0.16 was achieved. This shows that the corner rounding does not necessarily remain unchanged during fiber drawing. The corner rounding can be increased by high drawing temperatures. It is thus possible by choosing appropriate drawing parameters to set a target corner rounding which is bigger than the corner rounding of the preform. Therefore it is possible to produce a certain product spectrum with a range of corner roundings from one preform.

In another embodiment the non-circular shaped fiber is produced under specific drawing parameters to increase solarization resistance. Solarization resistance means the ability of the fiber to sustain light in the wavelength range of 150 to 2700 nm whereas the range of 150 to 650 nm and especially 200 to 270 nm has to most impact on solarization resistance, with a minor transmission loss. Fibers produced under standard parameters show a transmission decrease below 20% of initial transmission after irradiation with UV light. By applying optimized drawing parameters this value can be increased to more than 50%, preferably more than 70% and even more preferably more than 90%. One major parameter to achieve this transmission increase is the reduction of the drawing speed. The lower the drawing speed the slower the cooling of the fiber and this increases the duration where structural defects can be cured.

By this low drawing speed the dwell time inside the hot drawing oven is increased, so that curing can already happen within the oven. This effect can be intensified by using preforms with a large outer diameter which reduces the preform in oven speed and increases the dwell time. Drawing speeds of less than 20 m/min, preferably less than 10 m/min and even more preferably less than 5 m/min are most effective.

Fibers with non-circular cores can be used as single fibers, but using them in fiber bundles is possible too. Especially if not only the core but also the cladding has a polygonal shape the packing density is higher compared to fiber bundles with circular outer shape fibers. This increases the lightguiding area inside the bundle and reduces the area which does not guide light.

In one embodiment a rectangular core is used. The aspect ratio is in principle not limited. But with respect to the production method, there might be some limitations. If the cladding layer is applied by a jacketing process, the dependence of the aspect ratio is correlated with the geometry of the jacket tube. The larger the aspect ratio is the more oval the jacket tube is produced to have a nearly even slit between tube and rod. In an advancement of this method the inner geometry of the jacket tube is adapted to the outer geometry of the substrate rod. For example jacket tubes with polygonal inner geometries are produced and collapsed on the respective substrate. So the slit dimensions are equal along the complete substrate circumference, so that there are no bubbles or material displacements during the jacketing process.

In another embodiment the cladding is produced with two different refractive indices. The first cladding layer has a larger refractive index than the second cladding layer, but both refractive indices are smaller than the refractive index of the core. By the ratio of the refractive indices of inner and outer cladding the numerical aperture can be influenced. In this context the thickness of the inner cladding can be used to increase or decrease the effect of the inner cladding. Thus even after the inner cladding is applied to the core an optimization of the numerical aperture is possible without having to remove the complete inner cladding. So a large mother substrate can be used to produce different target values, which reduces the production effort and time. Furthermore large substrates can be used as a mother substrate, which reduces the processing costs (grinding, polishing) in respect to the mass of the final product. By the flexibility given by the additional cladding not the complete mother substrate has to be used for a single product design but can by divided for small amounts of final product. By this small amounts of a certain product design can be produced very efficiently, because one mother substrate can always be used.

The concepts discussed in the embodiments can be used independent of the outer diameter of the semi-finished product of final product. Preforms might have diameters above 15 mm whereas a range of 20 to 50 mm is preferred and 25 to 35 mm is even more preferred, because at these dimension the necessary production steps can be carried out at lower temperatures compared to larger sized substrates, which has an advantageous effect of the corner rounding. The fibers of these preforms are typically drawn to outer diameter up to 1200 µm, with a preferred diameter range of 75 to 600 µm and an even more preferred diameter range of 200 to 500 µm. Preforms might also be drawn to larger diameters, when the resulting product is not a fiber, but a lightguiding rod. Diameters in the range of 1.2 to 15 mm preferred 2 to 6 mm and even more preferred 2.5 to 3.5 mm can be produced.

What is claimed is:

1. A preform for an optical waveguide comprising a non-circular core having a non-circular geometry and at least one cladding layer surrounding the non-circular core, a coating, and optionally a barrier applied to the cladding, the preform having a target numerical aperture NA, the cladding layer including a dopand;
   wherein a concentration of the dopand of the cladding layer is equal to or greater than an effective dopand concentration multiplied by a factor F;
   wherein the effective dopand concentration is determined from the target numerical aperture NA of an optical fiber preform having a circular core and cladding doped with a same dopand as the dopand of the cladding layer of the non-circular core; and
   wherein the factor F is a function of a corner rounding value V of the non-circular core and is defined by $$F = V \times (1+(C-1) \times N) \times (1+(S-1) \times N)$$

in which:
   N is a number of corners of the non-circular core;

$$C = \frac{1}{1-(NA_{Coating} - NA_{Cladding})^3}$$

in which $NA_{coating}$ is a numerical aperture of the coating, and $NA_{Cladding}$ is a numerical aperture of the cladding, and $NA_{coating}$ is equal to or greater than $NA_{Cladding}$;

$$S = 1+(CTE_S - CTE_C)^{SCV}$$

in which:

$CTE_s$ is a coefficient of thermal expansion of the barrier layer,
$CTE_c$ is a coefficient of thermal expansion of the cladding, and
SCV is a ratio of an outer diameter of the barrier layer to an outer diameter of the cladding layer; and $$V = 1 - \frac{Od/Id - 1}{1/\cos(180/N) - 1}$$

in which:
Od is a diameter of a circle containing and touching a corner of the non-circular core,
Id is a diameter of a circle within and touching a side of the non-circular core, and
N is a number of corners of the non-circular core.

2. The preform according to claim 1, wherein the dopand is fluorine.

3. The preform according to claim 1, wherein the non-circular core is made of undoped quartz and has a polygonal shape and the cladding layer has a fluorine concentration between 2 and 8 wt %.

4. The preform according to claim 3, wherein the cladding layer is further surrounded by a barrier layer.

5. The preform according to claim 4, wherein the ratio of the barrier layer diameter to the core diameter is larger than 2.5.

6. The preform according to claim 5, wherein the ratio of the barrier layer diameter to the core diameter is larger than 4.

7. The preform according to claim 6, wherein the ratio of the barrier layer diameter to the core diameter is larger than 5.8.

8. The preform according to claim 1, further comprising a coating applied as an outer layer and having a numerical aperture larger than that of the cladding layer or any additional cladding layer.

9. The preform of claim 1, wherein F=V.

10. The preform of claim 1, wherein if $NA_{coating}$ is less than $NA_{Cladding}$, then C=1.

11. The preform of claim 1, wherein if there is no barrier layer, then S=1.

* * * * *